No. 789,207. PATENTED MAY 9, 1905.
L. F. COOK.
APPLIANCE FOR THE PROTECTION OF PILES, &c.
APPLICATION FILED JUNE 30, 1902.
3 SHEETS—SHEET 1.
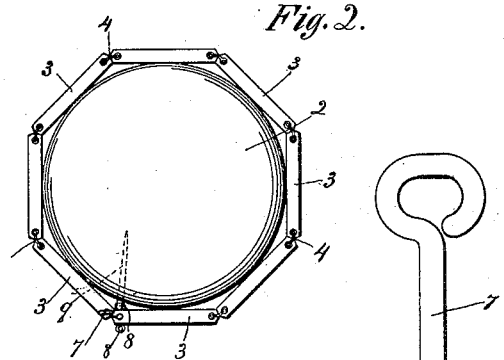
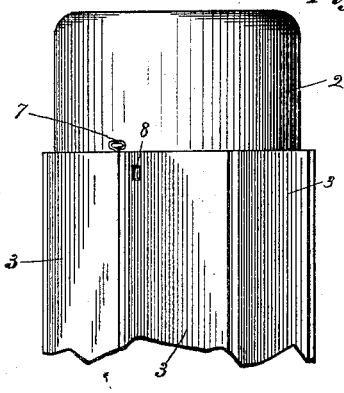
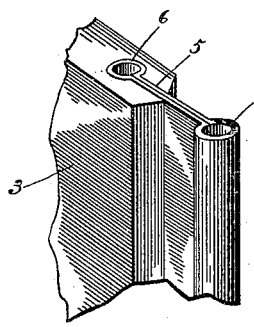
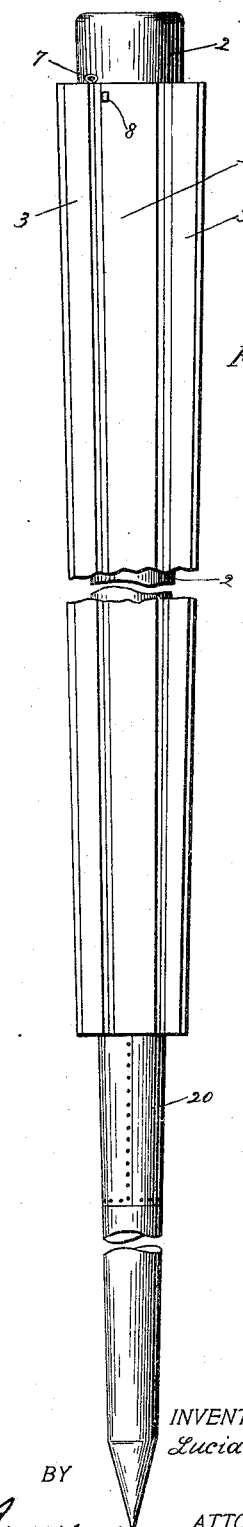
WITNESSES:
W. H. Cotton
H. P. Owens
INVENTOR.
Lucian F. Cook
BY
Fred H. Rowerson
ATTORNEY.

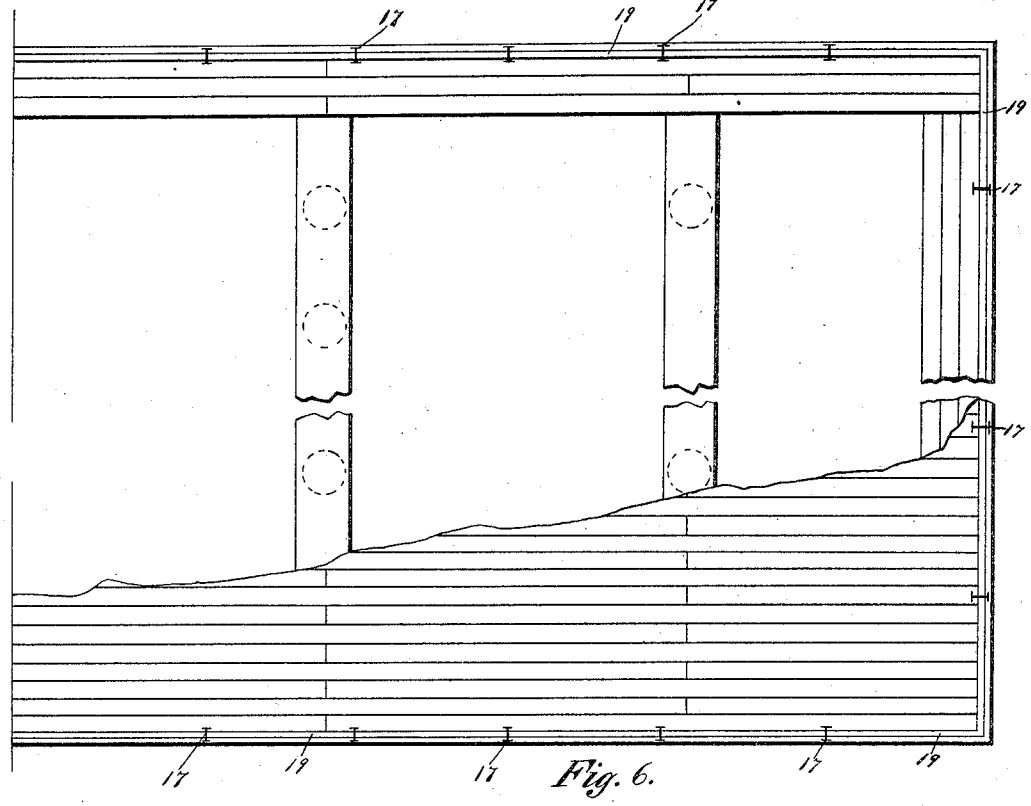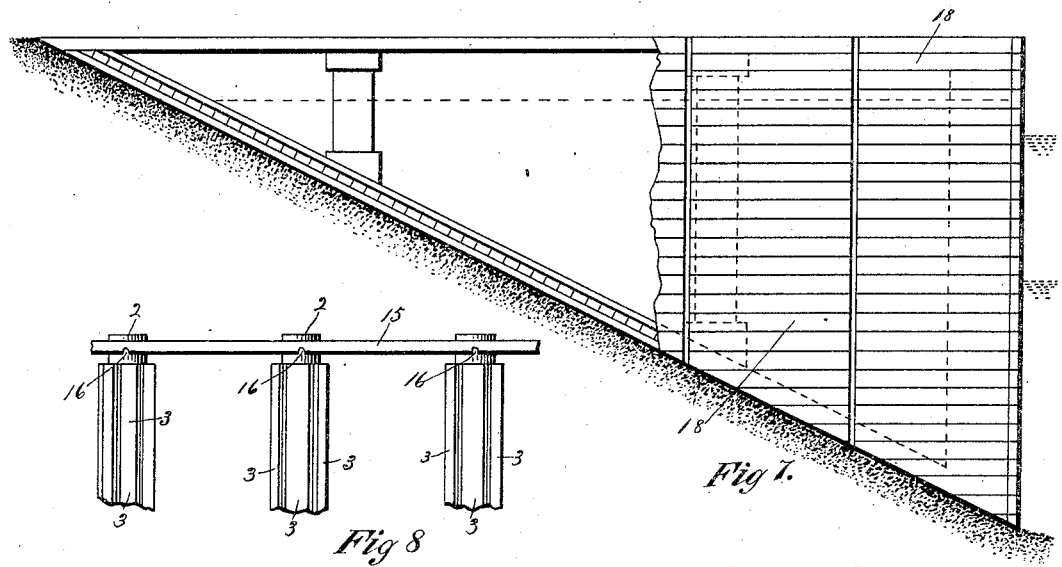

Fig. 9
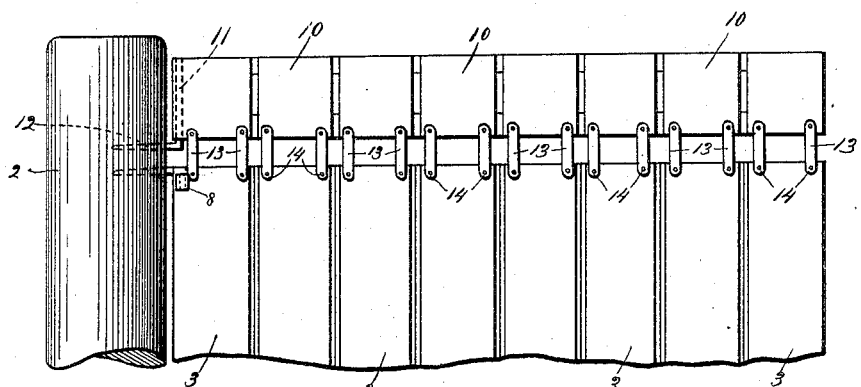
Fig. 10.
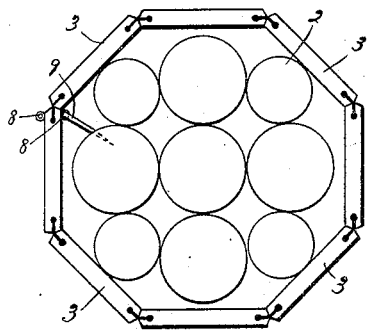
Fig. 11.
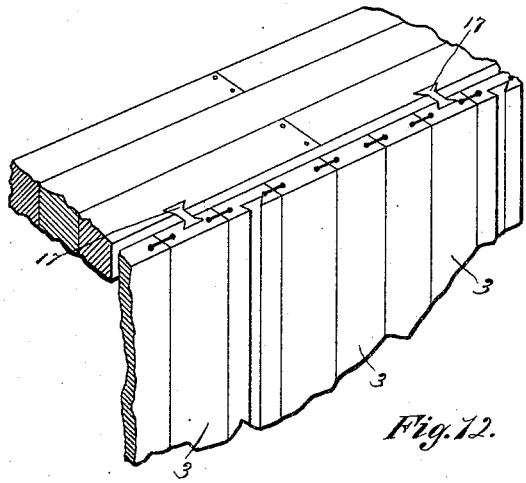
Fig. 12.

No. 789,207. Patented May 9, 1905.

UNITED STATES PATENT OFFICE.

LUCIAN F. COOK, OF CHICAGO, ILLINOIS.

APPLIANCE FOR THE PROTECTION OF PILES, &c.

SPECIFICATION forming part of Letters Patent No. 789,207, dated May 9, 1905.

Application filed June 30, 1902. Serial No. 113,778.

*To all whom it may concern:*

Be it known that I, LUCIAN F. COOK, a citizen of the United States, residing at Chicago, in the county of Cook and State of Illinois, have invented certain new and useful Improvements in Appliances for the Protection of Piles and Structures in Salt Water, of which the following is a specification.

This invention relates to simple and effective means for preventing the operation of marine pests, particularly the teredo, upon structures in salt water.

As is well known, the teredo—probably the most destructive marine insect—and like pests can exist only in salt water. Several methods have been tried to protect ships, piers, piles, &c., from these pests, such as copper sheathing, treating with creosote or corrosive sublimate, or driving numbers of short broad-headed nails into the timber, the rust of which spreads and prevents the animals from settling. These methods are all more or less unsatisfactory or difficult and expensive of application, and hence are in exceedingly restricted use. My invention is based upon the fact that these marine pests cannot exist in fresh water; and it consists generally in means for retaining what may be termed a "coating" of fresh water around fixed marine structures or around such portions thereof as would otherwise be exposed to salt water; and my invention further consists in means for constantly supplying fresh water to form the coating aforesaid, which is thus kept continually in motion and always fresh; and my invention further consists in constructing the retaining means in such a way that said means may be reversible, so that its sides may alternately be in contact with salt and fresh water in order that it may itself be at least partially protected from the ravages of these pests; and my invention further consists in the various details of construction and in combinations of parts, all as hereinafter described, and particularly pointed out in the claims.

My invention will be more readily understood by reference to the accompanying drawings, forming a part of this specification, and in which—

Figure 1 is a side elevation of a pile provided with a jacket or casing embodying my invention. Fig. 2 is a top plan thereof on a slightly-enlarged scale. Fig. 3 is a side elevation of Fig. 2, the lower portion of the pile and jacket being broken off. Fig. 4 shows one edge of one of the members of the jacket and the flexible hinge or connection. Fig. 5 is an enlarged view of a pin or rod employed to retain the flexible hinge or connection within the edges of the members or sections of the jacket or casing. Fig. 6 is a top plan view of a wharf or dock, showing the means for securing an outer jacket or casing thereto, whereby to provide a space for the fresh water. Fig. 7 is a side elevation of Fig. 6, part of the jacket being cut away. Fig. 8 shows a pipe or conduit leading from a head or source of fresh-water supply and showing the discharge into the pile-jackets. Fig. 9 illustrates a modified form of applying my jackets or casings to piling by placing two sheets of flexible sections on alternate sides of two or more rows of piles, whereby all the piles are protected by the reversal of the casings at intervals. Fig. 10 shows an attachment to the top of the jacket, whereby to assist in its ready reversal about a pile. Fig. 11 shows the jacket applied to a cluster of piles. Fig. 12 shows a flexible or jointed jacket or shield applied to the face of a seawall, dock, wharf, or similar structure.

Referring now to the drawings in detail, numeral 2 refers to a pile which I have shown incased by a flexible water-tight jacket, preferably comprising a plurality of separable sections or members 3 3, united with each other by flexible hinges or connecting devices 4 4, of canvas, rubber, leather, metal, or other suitable material. I prefer to employ flexible material for this connecting device in the form of a flattened tube or a double web, with a longitudinal loop 6 at each edge, the flattened edges of which are inserted into longitudinal slots 5 in the edges of the sections or members 3 3 and expanded by a pin or rod, which is forced thereinto to prevent withdrawal of said loop from the slot, said slot being provided with a corresponding enlarged portion to permit of this expansion. The same result may be obtained by inflating the loops 6 with air or water under pressure, which would of course necessitate the sealing of the extremities thereof, and also constructing them as independent tubes. As it is only necessary to withdraw one of these pins or rods in order to remove or effect the reversal of the casing, only one of these pins need project above the top edge of the casing, which pin or rod 7 I have shown provided with a loop at the top, whereby to effect its withdrawal when desired. I have further shown the pin 7 made up of a plurality of sections suitably joined together for the purpose of permitting its withdrawal or insertion under conditions which would make this impossible were said pin in one rigid piece—as, for instance, under the floor of a dock or wharf. Where there is no obstruction above the pile, however, this pin may be made in one piece. The jacket or casing may be made of material impervious to the ravages of pests; but for cheapness of construction and convenience in manufacture and operation I prefer that the members or sections 3 shall be of wood. If made of wood or any other material subject to the ravages of these pests, it will be necessary to reverse the jacket or casing when the teredo have begun to work upon the side thereof which is exposed to the sea-water. To facilitate the operation of reversal, I may employ a simple hook-and-eye hinge device, one eye member 8 being screwed into or otherwise suitably attached to the edge of one of the members or sections 3 and the hook member 9 preferably comprising a spike provided with a vertical arm slidable within said eye member. If said jacket is made of material lighter than water, and consequently buoyant, it will be necessary, of course, for the vertical portion of the spike 9 to extend downward to overcome the buoyancy of said jacket. To reverse the jacket, the pin 7 should be withdrawn, the loop of the connecting device removed from the slot, and the jacket unwound until the free extremity has been twice around the pile, when the detached edge will again be in position to be secured to the flexible connecting device, as before. The jacket will then have been completely reversed, and consequently will now present to the fresh water the side which has been in contact with the salt water. Of course in reversing it will be necessary to change the hook from one to the other of the eye members 8. To further facilitate the reversal of these jackets and prevent possible slipping or sliding of the several sections 3 3 with reference to each other during the operation of reversal, I have shown in Fig. 10 a detachable horizontally-flexible supporting-arm, preferably comprising the same number of suitably-hinged sections or plates 10 10 as there are sections or members in the jacket. This arm is vertically rigid and should be pivotally attached at one extremity to the pile, preferably by means of a vertical hinge-rod 11, provided with a horizontal shank 12, adapted to be driven into the pile, the end of the plate or section being provided with a suitable channel or bore into which said hinge-rod is inserted. The sections or plates 10 constituting this arm may be individually secured to the members of the jacket by means of pendent links 13 13, pivotally connected with said sections or plates at their upper extremities and temporarily secured to the members of the jacket, preferably by detachable pins or bolts 14. When the jacket has been reversed, the pins 14 14 may be withdrawn and said arm readily removed.

It is essential, of course, that the space between the pile or structure to be protected and the jacket incasing the same shall be kept constantly filled with fresh water, to accomplish which I prefer to employ a pipe, hose, or other suitable conduit 15, as shown in Fig. 8, leading to any suitable head or source of fresh-water supply. Apertures 16 16 in this conduit, located over the spaces within said jackets, permit of a continuous discharge of fresh water into said spaces, causing a slight downward current of fresh water through said jackets and out at the lower extremities thereof, thus keeping the spaces constantly filled with fresh water. When the members 3 3, comprising said jacket, are formed of wood and the teredo have attacked them, the jacket may be reversed, exposing the side thus attacked to the action of the fresh water, which has the effect of entirely eradicating the pests. It will thus be apparent that by occasionally reversing the jackets the same ones may be used for years without being replaced. Naturally if the jacket is made of material not subject to attack by marine pests it will not be necessary to make it reversible; but whether reversible or not the supply of fresh water between the jacket and the pile, dock, or wharf must be constant and of sufficient volume to keep the structure to be protected surrounded by a coating of fresh water.

It will be apparent that my jacket or casing may be applied to a cluster as well as to a single pile, as shown in Fig. 11. Furthermore, when there are two or more rows of piling the flexible casings may be arranged alternately on opposite piles, leaving a fresh-water space between two runs of the casing, as illustrated in Fig. 9. By replacing the runs of said casing, as shown by dotted lines, those piles formerly exposed to salt water will be exposed to fresh water, and vice versa, and similarly the side of the casing which was expost to salt water will be exposed to fresh water, and the teredo that may have commenced boring therein will be exterminated.

In the construction of wharves, docks, and similar structures I utilize the fresh water for protecting the bulkhead or sea-walls when used to support the weight in lieu of piling, as illustrated in Figs. 6 and 7, wherein I have shown a sea-wall the edges whereof are provided with I-beams 17 17, whereby to secure in a removable manner the planks or timbers 18, said planks being so grooved or recessed to readily fit down over the flanges on the exposed ends of the beam 17. The beams are so placed relative to the face of the sea-wall that fresh-water channels 19 19 are formed between the sea-wall and the planks 18. The planks may be reversed from time to time, being correspondingly grooved upon their opposite faces for this purpose. Fresh water may be supplied to the channel or space 19 in the same manner as shown and described for supplying fresh water to the spaces between the pile and jacket or in any other suitable manner.

On tide-water it is very desirable to provide means at docks and wharves for supplying fresh water to steamers, stationary engines, and for other purposes, and I am enabled to utilize the interior of a dock or wharf as a fresh-water reservoir by providing a permanent and substantially water-tight casing, which casing is in turn surrounded by the reversible fresh-water jacket. This reservoir itself may supply the fresh water to the channels or spaces between the permanent casing and the reversible jacket, all that is necessary to accomplish this purpose being suitable perforations in the permanent casing at the normal fresh-water line, (indicated by the horizontal dotted line in Fig. 7,) fresh water being continuously supplied to the reservoir, which when a sufficient depth is reached flows through said perforations and into said fresh-water channels. I may, however, employ my flexible jacket for the protection of docks or wharves, as shown in Fig. 12, certain members or sections of the jacket being suitably grooved to receive the projecting portion of the I-beam 17. Opposite faces of the same or other sections should be similarly grooved to provide for the reversal of the jacket when desired.

The piles being jacketed or the sides of the wharves, sea-walls, or other structures being incased or jacketed as above described, a supply of fresh water is furnished which being from a head above high tide at all times will fill the space between the structure to be protected and the jacket or casing with fresh water, and since fresh water is lighter than salt water it will after passing out at the bottom of the jacket or casing ascend along the exterior face thereof, and thus even on the side of the jacket exposed to the salt water (and to the teredo) have the effect to destroy the teredo. It must be remembered in this connection that the pile-jackets and the casing on the face of sea-walls, docks, &c., extend down to about the surface of the material into which the piles are driven or upon which the structure is built, and, if desirable, that portion of the pile or other structure at or near the ground-line may be provided with a copper casing 20, Fig. 1, or other protection.

Attention is called to the fact that salt water holds in solution certain acids which act upon some metals, particularly iron and iron products. This fact has doubtless prevented more general use of iron piling and iron or steel structures in salt water. It will be apparent that the employment of my means for retaining a coating of fresh water around metallic structures will prevent their disintegration through the action of the salt water or acids in solution therein.

I desire to have it distinctly understood that I do not confine myself to the precise construction of jacket or casing shown and described herein, as it is evident that many modifications may be resorted to to accomplish the result desired, which is, broadly, to surround or partially surround with fresh water piles, sea-walls, wharves, docks, and other structures located in salt water by jackets or shields to which fresh water is constantly supplied, whereby said structures are preserved from the ravages of marine worms or insects and from the chemical action of the salt water and the acids contained therein.

Having thus described my invention, I claim as new and desire to secure by Letters Patent—

1. As a means for protecting piles or other structures in salt water, the combination with a pile or other structure of a jacket or casing whereby a space is provided between the part to be protected and said jacket or casing, and means for supplying fresh water to said space.

2. As a means for protecting piles or other structures in salt water, the combination with a pile or other structure of a reversible jacket or casing whereby a space is provided between the part to be protected and said jacket or casing, and means for supplying fresh water to said space.

3. The combination with a structure immersed in salt water, of means for supplying and retaining fresh water around said structure.

4. In devices for protecting structures in salt water, the combination with the structure to be protected of a jacket or casing comprising a plurality of sections flexibly connected together, said jacket or casing being located relative to said structure as to leave a space between the two, and means for supplying fresh water to said space.

5. The combination with a plurality of piles or other structures surrounded by salt water, of means providing a channel for fresh water to contact with said piles or structures, and means for supplying fresh water to said channel.

6. In a device for protecting structures in salt water, the combination with a reversible jacket or casing of a flexible arm, means for detachably connecting said arm with said jacket or casing, and means for detachably connecting said arm with the structure to be protected.

7. In a device for protecting structures in salt water, the combination with a plurality of sections forming a jacket or casing, of flexible connecting-strips inserted in longitudinal recesses in said sections, and means for expanding the inserted portions whereby they are prevented from being withdrawn from said recesses.

8. In a device for protecting structures in salt water, the combination with the structure to be protected of a removable and separable jacket or casing, and a conduit leading from a suitable head of fresh water and discharging into the space between the jacket and the structure.

9. In a device for protecting structures in salt water, the combination with the structure to be protected of a reversible and separable jacket or casing, and a conduit leading from a suitable head of fresh water and discharging into the space between the jacket and the structure.

In testimony of the foregoing I have hereunto set my hand, this 23d day of June, 1902, in the presence of two subscribing witnesses.

LUCIAN F. COOK.

Witnesses:
J. F. HOSTETLER,
MINNIE B. SNITKOFF.